Sept. 20, 1932.                E. O. LÖFGREN                1,878,639
                    VARIABLE ROTARY ELECTRIC CONDENSER
                           Filed June 30. 1927

E. O. Lofgren
    INVENTOR

By: Marks & Clerk
          Attys.

Patented Sept. 20, 1932

1,878,639

UNITED STATES PATENT OFFICE

ERIK OLOF LÖFGREN, OF STOCKHOLM, SWEDEN, ASSIGNOR TO TELEFONAKTIEBOLAGET L. M. ERICSSON, OF STOCKHOLM, SWEDEN, A COMPANY OF SWEDEN

VARIABLE ROTARY ELECTRIC CONDENSER

Application filed June 30, 1927, Serial No. 202,713, and in Sweden July 22, 1926.

The present invention refers to variable condensers having a system of fixed and a system of movable plates set at right angles to the axis of rotation, and more particularly the invention relates to such condensers of the type mentioned which are distinguished by the capacity increasing slowly in the beginning but at an ever augmented rate for greater angles of rotation. The object of the invention is to obviate as far as possible certain disadvantages from a mechanical as well as an electrical point of view as set forth in the following, such disadvantages being present in the condensers of this type as hitherto used.

Previously, the most common type of condensers was that with semi-circular plates. In such a condenser, the capacity is directly proportional to the angle of rotation. One disadvantage in these condensers is that the absolute value of the average error of reading and adjustment is constant over the whole scale and is consequently very great, proportionately, at low values of the capacity. Employed as a tuning condenser in a radio receiving apparatus such a condenser is very difficult to set for a station within the lower portion of the attainable wave length range. To obviate this, condensers have been designed having plates of such a shape that the capacity is increasing slowly in the beginning but at an ever augmented rate at greater capacitative values. The most suitable shapes of the plates for a tuning condenser is one giving a straight line frequency curve.

Figure 1:
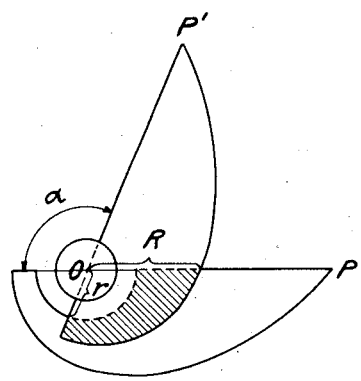

Figure 1 shows the shape of the disks as hitherto used in these specially designed condensers. When turning the movable system with a small angle $$\Delta \alpha$$

the common surface between two adjacent plates is increased with a value $$\Delta A = \tfrac{1}{2} /R^2 - r^2/ \Delta a$$

where R and r are the radii from the centre of the axis of rotation to the outer and inner intersecting points respectively of the plate contours. As a rule, the inner intersecting point is constant, and thus the central recess of the fixed plates is a semi-circle concentric to the axis. The formula for the capacity as expressed in micromicrofarads, for a condenser with an air dielectric and comprising all in all $n$ plates, each having the surface A and the plates being at a distance $d$ from one another, is:

$$C = \frac{/n-1/}{3,6} \frac{A}{\pi d} \text{ micromicrofarads}$$

For the derivative of the capacity with respect to the angle of rotation $$\frac{dC}{d\alpha} = \frac{/n-1/}{7,2} \frac{/R^2-r^2/}{\pi d}$$

By suitably selecting R as a function of $\alpha$ it is possible to design the desired capacity curve. The construction of the plates is then very simple in the condenser in question by reason of the fact that the outer intersection point between the plate contours, which is determinative of the radius R, only moves in a radial direction but not angularly. Thus it is only necessary to set off R in a direction equal to the angle of rotation, $\alpha$, counted from the direction of the base radius. In other words, the plate contour is identical to the polar curve $R = f/\alpha/$.

Figure 1 actually shows a condenser of the type giving a straight line frequency curve. As will be seen from the figure, the plates are long and narrow, which entails a number of disadvantages both from a mechanical and an electrical point of view. Thus the condenser will be rather bulky, particularly if the same is to be provided with a housing affording mechanical and electrical protection. Furthermore, certain difficulties are met with in providing the requisite rigidity in the two plate systems with this shape of the plates. The minimum capacity is always greater with an elongated than with a more compact form of the plate.

Figure 2:
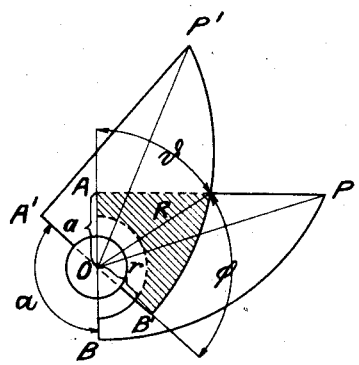

More advantageous in this respect is an arrangement of the plates which forms the object of the present invention and which is illustrated in Figure 2. While the active surface of the non-symmetrical condenser plates as heretofore used is situated altogether on the one side of the line OP, OP', which is drawn from the centre of the axis of rotation to the apex of the plate, that is to say, the maximum radius, said surface is distributed, according to the invention non-symmetrically to both sides of said line. The one of the edges AP extending to the apex is preferably a straight line at right angle to the base radius OA of the plate. Owing to certain considerations, it is preferred to provide the axis at the middle point of the base line AB.

In principle, the calculation of the condenser for a certain capacity curve is done according to the following method. Here, as in every other type of a rotary condenser, the formula given in the foregoing holds good for the derivative of the capacity in respect of the angle $\alpha$. Provided that $r$ is given, then a value for the intersecting radius R corresponding to each angle of rotation $\alpha$ is obtained from the desired capacity curve. To obtain the outer contour of the plate, this radius will have to be set off at an angle $\pi$ from the base radius OB', constituting the difference between the angle of rotation $\alpha$ and another variable angle $\vartheta$ which is calculated from the equation $$\cos \vartheta = \frac{a}{R}$$

where $a$ is equal to the length of the base radius OA.

From the basic type of the plates herein set forth, greater or smaller deviations are of course conceivable, without the principle of the invention being departed from.

I claim:

In a rotary condenser, a plurality of stator plates and a plurality of rotor plates disposed at right angles to their axis of rotation and adjacent to said stator plates, the curved edges of the rotor plates intersecting the straight edges of the stator plates at a distance from the axis of rotation of the rotor plates, the said distance varying with the angle of rotation and reaching a maximum value in the maximum capacity position of the condenser plates, and said plates having their active surface distributed non-symmetrically on both sides of the maximum radius.

In testimony whereof I affix my signature.

ERIK OLOF LÖFGREN.